United States Patent
Thakur et al.

(10) Patent No.: US 9,840,671 B2
(45) Date of Patent: Dec. 12, 2017

(54) DELAYED COKING PROCESS

(71) Applicant: INDIAN OIL CORPORATION LIMITED, Mumbai, Maharashtra (IN)

(72) Inventors: Ram Mohan Thakur, Faridabad (IN); Ajay Kumar Arora, Faridabad (IN); Terapalli Hari Venkata Devi Prasad, Faridabad (IN); Pradeep Ponoly Ramachandran, Faridabad (IN); Jagdev Kumar Dixit, Faridabad (IN); Rajesh, Faridabad (IN); Debasis Bhattacharyya, Faridabad (IN); Suresh Kumar Puri, Faridabad (IN); Brijesh Kumar, Faridabad (IN); Santanam Rajagopal, Faridabad (IN); Ravinder Kumar Malhotra, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 378 days.

(21) Appl. No.: 14/549,525

(22) Filed: Nov. 20, 2014

(65) Prior Publication Data
US 2015/0152334 A1    Jun. 4, 2015

(30) Foreign Application Priority Data

Nov. 23, 2013    (IN) .......................... 3691/MUM/2013

(51) Int. Cl.
*C10G 9/00* (2006.01)
*C10B 57/04* (2006.01)
*C10G 55/02* (2006.01)
*C10B 55/00* (2006.01)
*C10B 53/02* (2006.01)

(52) U.S. Cl.
CPC .............. *C10G 9/005* (2013.01); *C10B 55/00* (2013.01); *C10B 57/045* (2013.01); *C10G 55/02* (2013.01); *C10B 53/02* (2013.01); *C10G 2300/107* (2013.01); *C10G 2300/1014* (2013.01); *C10G 2300/1077* (2013.01); *Y02E 50/14* (2013.01); *Y02P 20/145* (2015.11); *Y02P 30/20* (2015.11)

(58) Field of Classification Search
CPC ....................................................... C10G 9/005
See application file for complete search history.

(56) References Cited

U.S. PATENT DOCUMENTS

| | | | |
|---|---|---|---|
| 3,493,489 A | 2/1970 | Naniche | |
| 3,891,538 A | 6/1975 | Walkey | |
| 4,492,625 A * | 1/1985 | Allan | .................... C10B 57/045 208/131 |
| 5,200,061 A * | 4/1993 | Viscontini | ............... C10B 39/04 208/131 |
| 2011/0232164 A1 | 9/2011 | Siskin et al. | |
| 2014/0069799 A1* | 3/2014 | Gorke | ..................... C10G 2/32 202/105 |

FOREIGN PATENT DOCUMENTS

WO    2010/012997 A2    2/2010

* cited by examiner

*Primary Examiner* — Renee Robinson
(74) *Attorney, Agent, or Firm* — Maschoff Brennan

(57) ABSTRACT

The present invention provides a delayed coking process comprising a step of subjecting a mixed feed comprises residual heavy hydrocarbon feedstock and bio oil obtained from fast pyrolysis of lignocellulosic biomass of one or more of Jatropha, Cashew nut, Karanjia and Neem to a delayed coking process and a system for the delayed coking process.

10 Claims, 7 Drawing Sheets

DELAYED COKING PROCESS

FIELD OF INVENTION

This invention relates to an improved Delayed coking process in which biooil is mixed with a heavy hydrocarbon feedstock passing into a coking zone. In a more specific instance this invention relates to an improved Delayed coking process in which biooil, generated by fast pyrolysis of different sources of biomass, and is added to the heavy hydrocarbon feedstock such as residual oil feed to the Delayed coking process for reduction of coke yield and enhancement of gas and liquid yields.

BACKGROUND OF THE INVENTION

Currently, the most common process for heavy oil upgradation is the Delayed coking process. A Delayed coker operates on the principle of thermal cracking and produces solid coke, gaseous and liquid products from heavy hydrocarbon feedstock. During the coking process, heavy hydrocarbon feedstock are heated in a furnace, passed through a transfer line and discharged into a coking drum. The feedstock is thermally converted to solid coke and vapors. The vapors formed in the coke drum leave the top of the drum and are passed to a fractionating column where they are separated into liquid and gaseous products. Sometimes these products are recycled with residual feed to the coke drum.

Worldwide, the deteriorating crude quality has resulted in higher yields of heavy residue with high Conradson carbon and higher sulphur and metals, which has in turn resulted in higher coke yield while processed in Delayed coker. The fuel grade pet coke produced from this heavy residue with high Conradson carbon and higher sulphur has lower price resulting in reduced margin around Delayed coker. Recently, technology improvements has focused on reducing cycle times, recycle rates and drum pressure with or without increase in heater outlet temperature to reduce coke yield and increase valuable gas and liquid yield. In the present scenario, the major aim of the refiner's is to minimize coke production and maximize gas and liquid products from residual feedstock.

Any process improvement in Delayed coking process which reduces the coke production and increases the liquid production is of interest to refiners. One of the processes used to improve Delayed coker operation is disclosed in U.S. Pat. No. 3,493,489 (U.S Class 208-50), which describes a process of integration of Fluid catalytic cracking and Delayed coking process which means that coker feed material can include the bottoms from the catalytic cracker fractionator column which includes decanted or slurry oil material.

U.S. Pat. No. 3,891,538 discloses the use of decanted oil, comprising the material boiling above 425° C. which is passed into coking zone along with residual feedstock.

U.S. 2011/0232164 A1 discloses a process of co-processing biomass pyrolysis oil along with heavy residues into the coking process to improve the operation of Delayed coking process and to utilize the biomaterial for the production of transportation fuels. However, this patent does not indicate any reduction of coke yield and enhancement of gas and liquid yields.

WO 2010/012997 A2 describes a process for production of biooil in Delayed coker unit by Co-feeding of biomass together with the conventional fresh feed of residual hydrocarbon feedstocks. However, this patent does not provide any information on the reduction in coke yield and increase in gas and liquid yield.

The object of the present invention is to provide an improved Delayed coking process in which feedstock to the coking zone is a mixture of residual heavy hydrocarbon feedstock and biooil which increase the liquid products produced from the coking zone and decreases the amount of solid coke produced in the coking zone.

The present invention overcomes one of the main problems associated with commercially operated Delayed coking processes. The primary object of these commercial processes is to produce high value low boiling liquid products from low value residual heavy hydrocarbon feedstock which normally boil in the range of from about 450° C. to 700° C. However, during the production of high value lighter liquid products, low value solid coke is also produced. This solid coke presents problems in handling and competes with other low cost solid fuels like coal. Accordingly, refiners attempt to reduce the amount of solid coke produced in Delayed coking process while attempting to increase the valuable $C_5+$ liquid components produced.

SUMMARY OF THE INVENTION

Accordingly, the present invention provides an improved process for the reduction of coke yield and increase in gas and liquid yields in Delayed coking units by co processing of Biooil generated from fast pyrolysis of biomass together with heavy hydrocarbon feedstock such as residual hydrocarbons.

The present invention discloses a delayed coking process comprising a step of subjecting a mixed feed comprising residual heavy hydrocarbon feedstock and bio oil obtained from fast pyrolysis of lignocellulosic biomass of one or more of Jatropha, Cashew nut, Karanjia and Neem to a delayed coking process.

In one embodiment of the present invention, the residual heavy hydrocarbon feedstock has boiling point in the range of 400° to 700° C.

In another embodiment of the present invention, the bio oil has boiling point in the boiling range of about 200° to 620° C.

In yet another embodiment of the present invention, the residual heavy hydrocarbon feedstock has Conradson carbon residue content of 15 to 27 wt % and the bio oil has Conradson carbon residue content of 7 to 10 wt %.

In still an embodiment of the present invention, the lignocellulosic biomass are selected from the group comprising of routes, stems, leaves and seeds or combination thereof.

In one embodiment of the present invention, the mixed feed is obtained by:
(a) mixing residual heavy hydrocarbon feedstock and bio oil to obtain a mixture;
(b) feeding the mixture thus obtained in step (a) to a bottom of a fractionator along with a condensed recycle oil; and
(c) withdrawing the mixed feed from the bottom of the fractionator.

In another embodiment of the present invention, the mixed feed is obtained by:
(a) feeding the residual heavy hydrocarbon feedstock to a bottom of a fractionator along with a condensed recycle oil;
(b) withdrawing a bottom fraction from the bottom of the fractionator; and
(c) mixing bio oil with the bottom fraction thus obtained in step (b) to obtain the mixed feed.

In another embodiment of the present invention, the mixed feed comprises 97 to 85 wt % of residual heavy hydrocarbon feedstock and 3 to 15 wt % of the bio oil.

In yet another embodiment of the present invention, the mixed feed is heated to a coking temperature prior to subjecting the same to delayed coking process.

In still an embodiment of the present invention, the coking temperature is in the range of 475° to 510° C.

In one embodiment of the present invention, the delayed coking process comprises:
(a) feeding the mixed feed to a coker drum and providing residence time for allowing thermal cracking of the mixed feed under coking conditions;
(b) withdrawing vapours from the coker drum and adding a quench media to the vapours thus withdrawn to obtain effluent vapours;
(c) transporting the effluent vapours thus obtained to a fractionator for separation into various products according to desired boiling ranges such as naphtha, light and heavy gasoils, coker fuel oil etc. The boiling ranges can vary from refinery to refinery. Typical boiling ranges for light Natpha is 35-100° C.; for Heavy Naphtha is 100-170° C.; for Light gas oil is 170-370° C.; and for Heavy gas oil is 370-530° C.

In yet another embodiment of the present invention, the residence time is in the range of 12 to 38 hours.

The present invention also provides a system for delayed coking process, comprises;
(a) an online or offline mixing mechanism for mixing residual heavy hydrocarbon feedstock and bio oil obtained from fast pyrolysis of lignocellulosic biomass of one or more of Jatropha, Cashew nut, Karanjia and Neem to obtain a mixed feed; and
(b) a coking drum for delayed coking of the mixed feed.

BRIEF DESCRIPTION OF PROCESS DRAWINGS

The attached figures show various aspects of the process of the present invention.

DETAILED DESCRIPTION OF INVENTION

Figure 1:
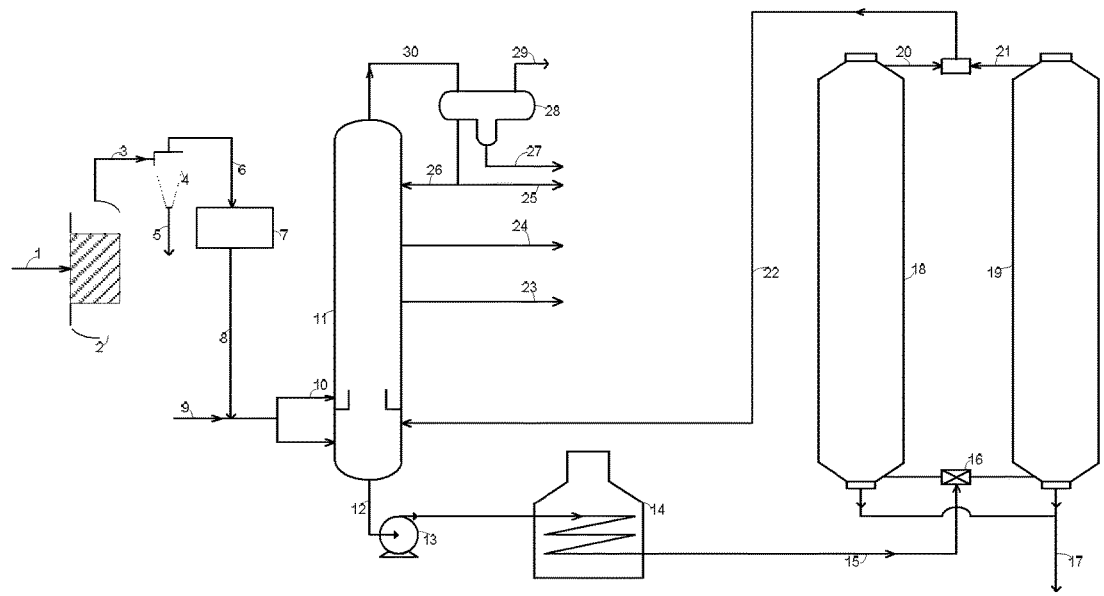
FIG. 1, illustrates a representative coking process of the present invention.

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The present invention provides as an improved Delayed coking process in which residual hydrocarbon feedstock is passed into a coking zone, wherein an improvement comprises mixing the residual heavy hydrocarbon feedstock with a biooil generated from fast pyrolysis of different sources of lignocellulosic biomass comprising the routes, stems, leaves and seeds of Jatropha, Karanjia, Neem, Cashew nut, wherein the resulting feedstock mixture contains biooil in the range of 3 to 15 percent by weight.

In a more specific instance, the residual heavy hydrocarbon feedstock boils within a range of about 400° C. to 700° C. and the biooil boils within a range of from about 200° C. to 620° C.

This embodiment of present invention potentially provides the greatest upgrade in value of Delayed coking process: (1) increase in liquid yields, while decreasing the coke yields, (2) improving the quality of coker gas oil (3) reducing 'vapor overcracking' and associated loss of liquids to lower gases, (4) reducing 'hotspots' and/or 'blowouts' & associated safety issues and costs, (5) addition of biooil, also reduces the propensity to produce 'shot coke' which produces hard and difficult to handle coke particle, (6) Improvement in quality of Naphtha (RON: 70 to 92), (7) Processing high throughput due to lower coke yield.

Accordingly, the present invention provides, an improved Delayed coking process in which residual heavy hydrocarbon feedstock mixed with biooil is processed under coking conditions to reduce coke yield and increase liquid yield wherein,
a. preheated biooil in the boiling range of 200° C. to 620° C. generated from fast pyrolysis of bio mass being mixed with residual heavy hydrocarbon feedstock in the boiling range of 400° C. to 700° C. to form a mixed feed;
b. the mixed feed being fed to the bottom of the fractionator where it combines with condensed recycle and being pumped out;
c. mixed feed exiting the fractionator being passed through a fired heater for heating up to the desired coking temperature;
d. the hot feed mixture being fed into the coke drum and being provided sufficient residence time for thermal cracking under coking conditions;
e. quenching media being added to the vapor line to quench vapors exiting from coke drum, to avoid coke formation in the vapor line;
f. effluent vapors after quenching, being fed into a fractionator for separation into various products according to desired boiling ranges.

According to the Delayed coking process, the yield of coke is lesser than that of conventional Delayed coking process for coking of residual heavy hydrocarbon feedstock in the boiling range of 400° C. to 700° C., by 2.0 to 20 wt %.

According to the Delayed coking process, the yield of valuable gaseous and liquid products is higher than that of conventional Delayed coking process for coking of residual heavy hydrocarbon feedstock in the boiling range of 400° C. to 700° C., by 2.0 to 20.0 wt %.

In one embodiment of the present invention, the biooil is generated from fast pyrolysis of lignocellulosic biomass comprising the routes, stems, leaves and seeds of Jatropha, Karanjia, Neem, Cashew nut, and contains insoluble pyrolytic lignin, aldehydes, carboxylic acids, carbohydrates, phenols, alcohols and ketones in the boiling range of about 200° C. to 620° C.

In another embodiment of the present invention, the residual heavy hydrocarbon feedstock and the biooil are having Conradson carbon residue content of 15 to 27 wt % and 7 to 10 wt % respectively.

In still another embodiment of the present invention, the amount of biooil in the mixed feed being varied from 3 to 15 wt %.

In yet another embodiment of the present invention, the residence time provided for thermal cracking varies from 12 to 38 hours.

According to the present invention, addition of biooil, also reduces the propensity to produce 'shot coke'.

In one of the embodiment, the present invention provides an improved Delayed coking process in which residual heavy hydrocarbon feedstock mixed with biooil is processed under coking conditions to reduce coke yield and increase liquid yield wherein,
a. residual hydrocarbon feedstock being fed into the bottom of the fractionator where it combines with condensed recycle and being pumped out,
b. preheated biooil in the boiling range of 200° C. to 620° C. generated from fast pyrolysis of bio mass being mixed with residual hydrocarbon feedstock in the boiling range of 400° C. to 700° C. to form a mixed feed,
c. mixed feed being passed through a fired heater for heating up to the desired coking temperature,
d. the hot feed mixture being fed into the coke drum and being provided sufficient residence time for thermal cracking under coking conditions,
e. quenching media being added to the vapor line to quench vapors exiting from coke drum, to avoid coke formation in the vapor line,
f. products after quenching, being fed into a fractionator for separation into various products according to desired boiling ranges.

According to this process, the yield of coke is lesser than that of conventional Delayed coking process for coking of residual heavy hydrocarbon feedstock in the boiling range of 400° C. to 700° C., by 2.0 to 20 wt %.

According to this process, the yield of valuable gaseous and liquid products is higher than that of conventional Delayed coking process for coking of residual heavy hydrocarbon feedstock in the boiling range of 400° C. to 700° C., by 2.0 to 20.0 wt %.

In yet another embodiment of the present invention, biooil is generated from fast pyrolysis of lignocellulosic biomass comprising the routes, stems, leaves and seeds of Jatropha, Karanjia, Neem, Cashew nut, and contains insoluble pyrolytic lignin, aldehydes, carboxylic acids, carbohydrates, phenols, alcohols and ketones in the boiling range of about 200° C. to 620° C.

In still another embodiment of the present invention, the amount of biooil in the mixed feed being varied from 3 to 15 wt %.

In yet another embodiment of the present invention, the residence time provided for thermal cracking varies from 12 to 38 hours.

According to the present invention, addition of biooil, also reduces the propensity to produce 'shot coke'.

In one embodiment of the present invention, the residual hydrocarbon feedstock and the biooil are having Conradson carbon residue content of 15 to 27 wt % and 7 to 10 wt % respectively.

In FIG. 1, Biomass (1) from different sources is passed into the pyrolysis reactor (2). The products recovered (3) from top reactor (2) are passed through cyclone (4) to separate biooil vapor (6) and char (5). The biooil vapors (6) are passed through the biooil recovery unit (7). The biooil separated from recovery unit (7) via line (8) and pass into fractionator (11), called main column in the refining industry. The bio, passes through line (10) along with hot residual heavy hydrocarbon feedstock (9) is introduced into bottom of the fractionator (11), where it combines with condensed recycle. This mixture (12) is pumped out using fractionator bottom pump(s) (13) through a coker heater (14), where the desired coking temperature (normally between 475° C. and 510° C.) is achieved, causing partial vaporization and mild cracking. A vapor liquid mixture (15) exits the heater and as control valve (16) diverts it to a coking drum (18). Sufficient residence time is provided in the coking drum to allow thermal cracking till completion of coking reactions. The vapor liquid mixture is thermally cracked in the drum to produce lighter hydrocarbons, which vaporize and exit the coke drum. The drum vapor line temperature (20, 21) is the measured parameter used to represent the average drum outlet temperature. Quenching media (eg. Gas oil or slop oil) is typically added to the vapor line to quench vapors to avoid coke formation in the vapor line. When coke drum (18) is sufficiently full of coke, the coking cycle ends and the heater outlet charge is then switched from first drum (18) to a parallel coke drum (19) to initiate its coking cycle, while the filled drum (18) undergoes a series of steps like steaming, water cooling, coke cutting, vapor heating and draining. The liquid (17) drained from the drums are fed to the blow down section. The cracked hydrocarbon vapors are transferred via line (22) to fractionator bottom (11), where they are separated and recovered. Coker heavy gas oil (HGO) (23) and Coker light gas oil (LGO) (24) are drawn off the fractionator at desired boiling temperature ranges. The fractionator overhead stream, wet gas (30) goes to separator (28), where it is separated into gaseous hydrocarbons (29), water (27) and unstabilized naphtha (25). A reflux fraction (26) is returned to the fractionator (11).

Figure 2:
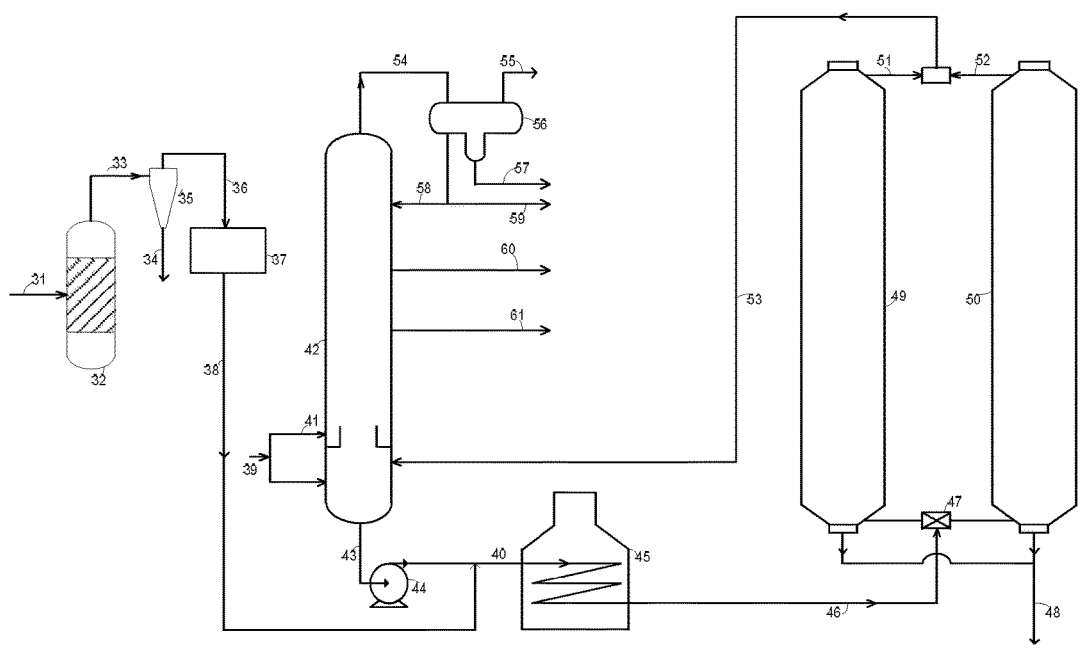
FIG. 2, illustrates representative coking process of an embodiment of the present invention

In FIG. 2, the preheated residual hydrocarbon feedstock (39) is fed into the fractionator bottom (41), where it combines with the condensed recycle and pumped out from fractionator (42) bottom. Biomass (31) from different sources is passed into the Pyrolysis reactor (32). The products recovered (33) from reactor top are passed through cyclone (35) to separate biooil vapor (36) and char (34). The biooil vapors are passed through the biooil recovery unit (37). The biooil separated (38) from recovery unit is then mixed with the residual heavy hydrocarbon feedstock exiting from the fractionator (42). This mixture (40) is pumped through a coker heater (45), where the desired coking temperature (normally between 475° C. and 510° C.) is achieved, causing partial vaporization and mild cracking A vapor liquid mixture (46) exits the heater and a control valve (47) diverts it to a coking drum (49). Sufficient residence time is provided in the coking drum to allow thermal cracking till completion of coking reactions. The vapor liquid mixture is thermally cracked in the drum to produce lighter hydrocarbons (51, 52), which vaporize and exit the coke drum. The drum vapor line temperature is the measured parameter used to represent the average drum outlet temperature. Quenching media (eg. Gas oil or slop oil) is typically added to the vapor line (53) to quench vapors to avoid coke formation in the vapor line. When coke drum is sufficiently full of coke, the coking cycle ends and the heater outlet charge is then switched from first drum (49) to a parallel coke drum (50) to initiate its coking cycle, while the filled drum (49) undergoes a series of steps like steaming, water cooling, coke cutting, vapor heating and draining. The liquid (48) drained from the drums is fed to the blow down section. The cracked hydrocarbon vapors (53) are transferred to fractionator bottom, where they are separated and recovered. Coker heavy gas oil (HGO) (61) and Coker light gas oil (LGO) (60) are drawn off the fractionator at desired boiling temperature ranges. The fractionator overhead stream, wet gas (54) goes to separator (56), where it is separated into gaseous hydrocarbons (55), water (57) and unstabilized naphtha (59). A reflux fraction (58) is returned to the fractionator (42).

Figure 3:
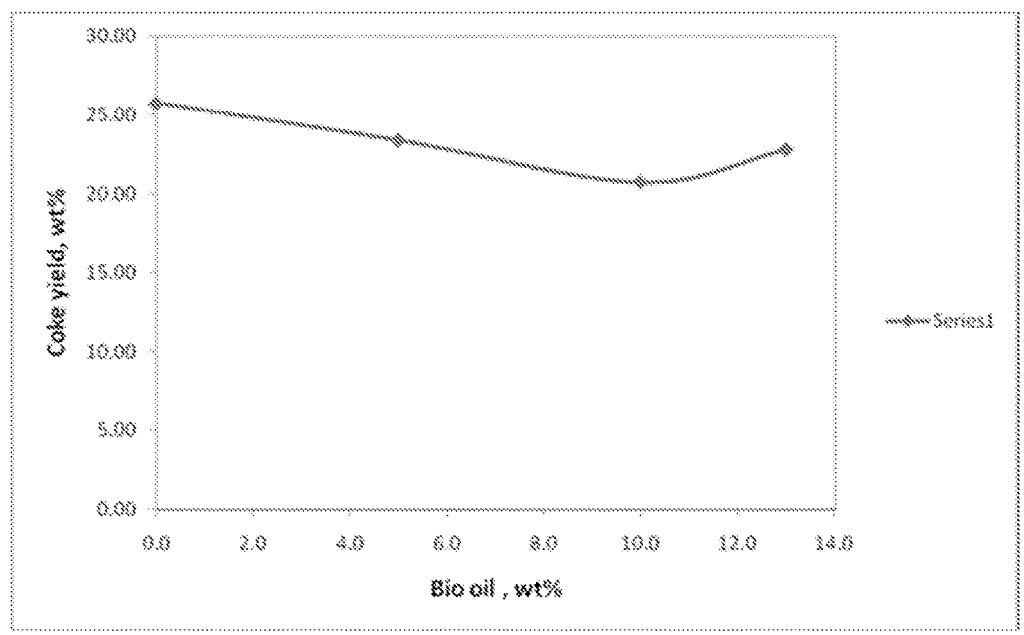
FIG. 3, illustrate pilot plant data showing the effect of biooil addition upon coke yields.
Figure 4:
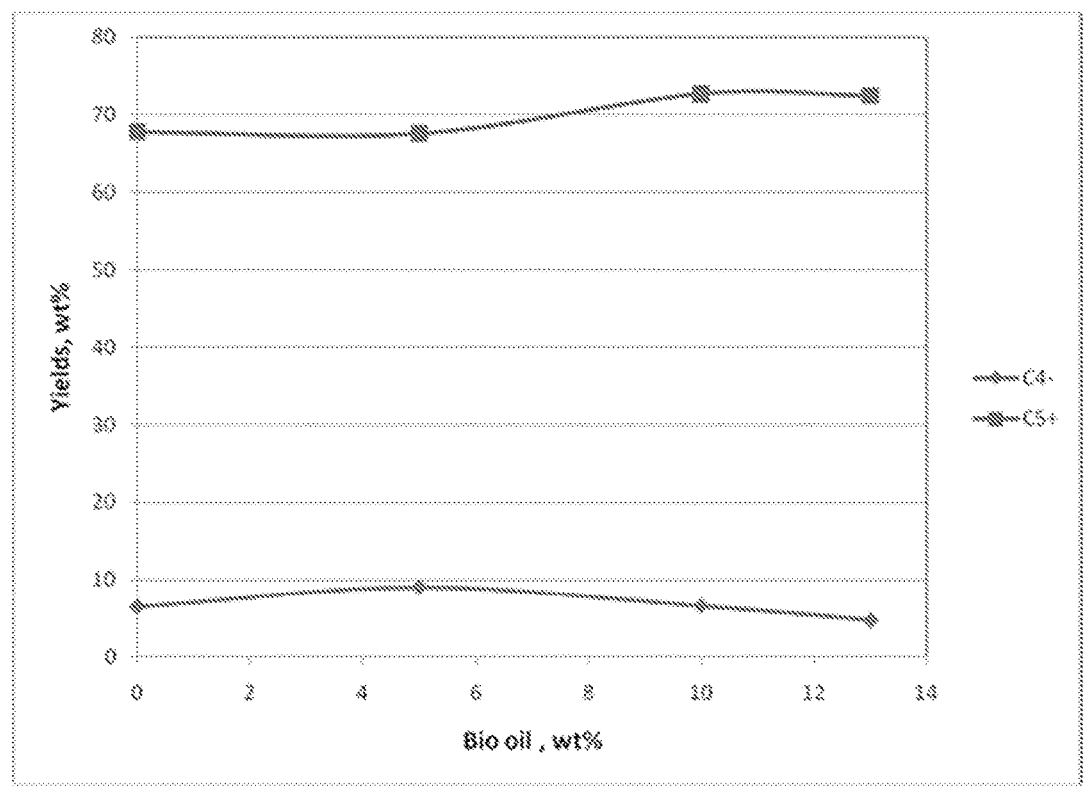
FIG. 4, depicts the relationship between biooil addition upon $C_5+$ and $C_4^-$ gas yields.

FIG. 3 and FIG. 4 show yields obtained from Delayed coking pilot plant experiments conducted at different composition of biooil added to the residual hydrocarbon feed.

Figure 5:
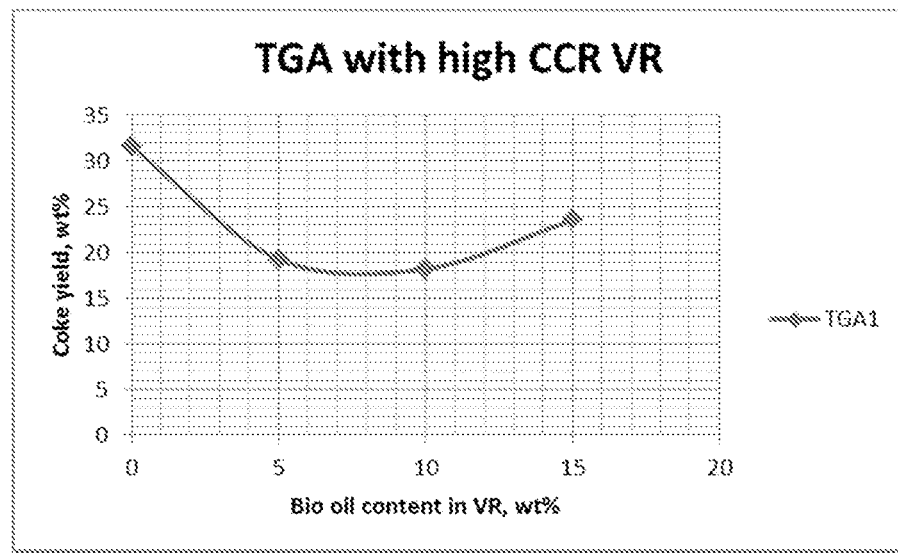
FIG. 5, illustrate Thermo Gravimetric Analysis (TGA) with high Conradson Carbon Residue (CCR) Vacuum Residue (VR).
Figure 6:
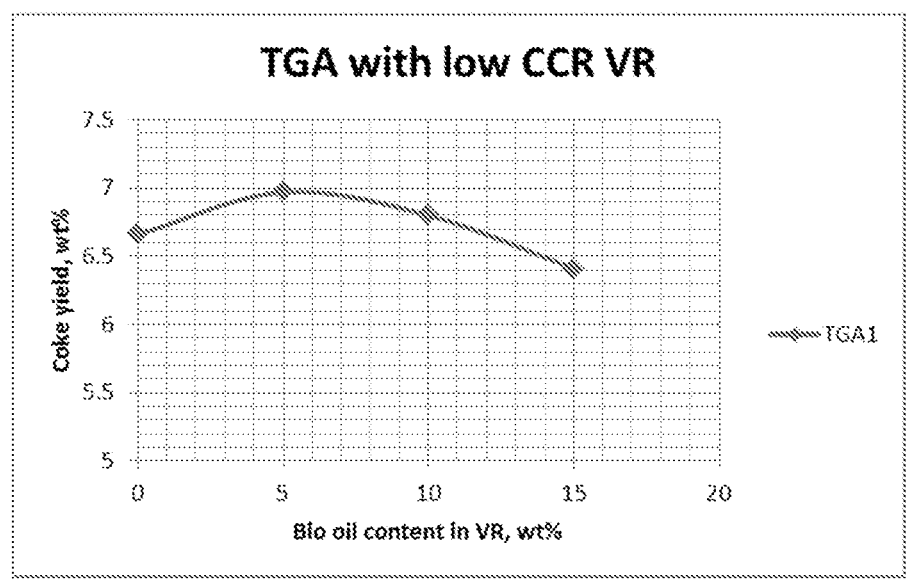
FIG. 6, illustrate Thermo Gravimetric Analysis (TGA) with low Conradson Carbon Residue (CCR) Vacuum Residue (VR).
Figure 7:
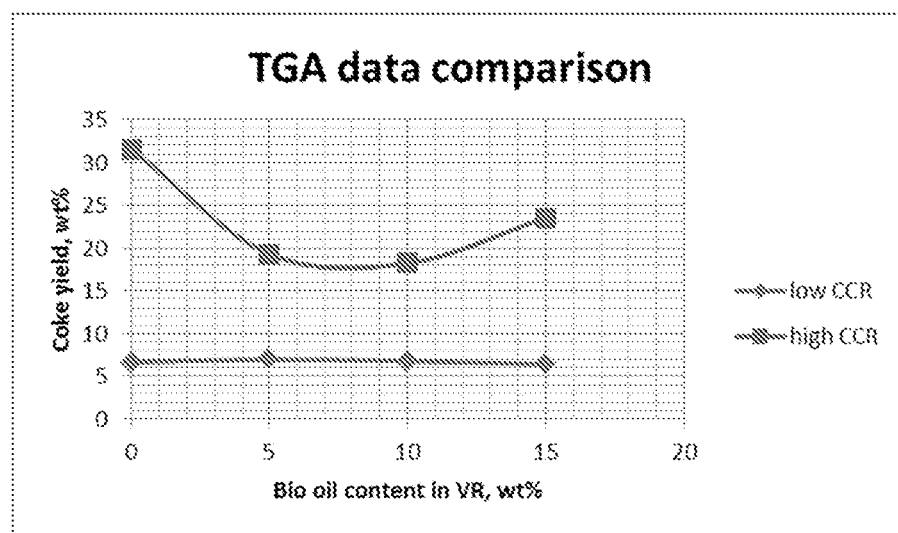
FIG. 7 illustrate Thermo Gravimetric Analysis (TGA) data comparison with low and high CCR.

FIG. 5, FIG. 6 and FIG. 7 show Thermo Gravimetric Analysis (TGA) of mixture of Vacuum Residue (VR) feed having different Conradson Carbon Residue (CCR) with bio-oil.

The following non-limiting examples illustrate in details about the invention. However, they are, not intended to be limiting the scope of present invention in any way.

Example

A Delayed coking pilot plant of 8 Kg/h feed rate was used for carrying out the experiments. Four experiments were conducted using commercially available residual heavy hydrocarbon feedstock (Resid feedstock A) and biooil (containing insoluble pyrolytic lignin, aldehydes, carboxylic acids, carbohydrates, phenols, alcohols and ketones). In one experiment 100 percent Resid feedstock was used and in the other three experiments various mixtures of Resid feedstock and biooil were used.

The experiments were performed in a Delayed coker pilot plant. The operating conditions for all the experiments were 495° C. feed furnace outlet line temperature, 14.935 psig coke drum pressure, 1 wt % steam addition to the coker feed and a feed rate maintained at about 8 kg/h. The operation was in semi batch mode. The vapors from the coking drums were recovered as liquid and gas products and no coker product was recycled to the coker drum.

The Delayed coking pilot plant unit was operated on 16 h cycle of which 12 h consisted of feeding the unit and 4 hrs of the cycle consisted of stripping and quenching. The characteristics of typical Resid feedstock and biooil are summarized in Table-I and Table-II respectively. The details of the four experiments are summarized in Table-III and results are plotted in FIG. 3 and FIG. 4.

From the pilot plant data reported in Table-III, it is evident that with addition of 10 wt % biooil in the residual feedstock coke yield reduces by 20 wt % with respect to that with 100 wt % residual feedstock. FIG. 3 indicates that with addition of biooil in residual feedstock, coke yield decreases up to certain extent of biooil addition and increases thereafter. Biooil is a micro emulsion in which continuous phase in an aqueous solution of holocellulose decompositions products that stabilizes the discontinuous phase of pyrolytic lignin macro-molecules through mechanisms such as hydrogen bonding. The instability is believed to result from breakdown of the emulsion. The pyrolytic lignin in biooil is analogous to asphaltenes in hydrocarbon feed. As the pyrolytic lignin increases in the feed, the propensity to coke formation increases resulting in higher coke yields.

The effect of biooil addition in resid feedstock on $C_5+$ yield and $C_4^-$ yield is plotted in FIG. 4. From FIG. 4, it is seen that with biooil addition there is no change in $C_5+$ yield up to certain extent of biooil addition and increases sharply thereafter. It is also observed that beyond certain extent of biooil addition, some of the 150° C.$^+$ was converting to coke, which can be also observed in FIG. 3. It is seen that the yield of $C_4^-$ increases with certain extent of biooil addition and decreases thereafter.

TABLE I

Properties of resid feed
Resid feed

| Property | Unit | Value |
|---|---|---|
| Conradson Carbon Residue (CCR) | Wt % | 22.05 |
| Asphaltene | Wt % | 7.1 |
| Sulfur | Wt % | 5.18 |
| Na | ppm | 4 |
| Mg | ppm | 1 |
| Ni | ppm | 91 |
| V | ppm | 146 |
| Fe | ppm | 10 |
| Paraffins | Wt % | 43.5 |
| Aromatics | Wt % | 56.5 |

TABLE II

Properties of Biooil
Biooil

| Property | Unit | Value |
|---|---|---|
| Conradson Carbon Residue (CCR) | wt % | 9.65 |
| Carbon | wt % | 64.3 |
| Hydrogen | wt % | 10.4 |
| Nitrogen | wt % | 3.9 |
| Sulfur | wt % | 2.2 |
| Ash | wt % | 0.05 |
| Heating value | Cal/g | 7938 |
| Calcium | ppm | 42 |
| Nickel | ppm | 1 |
| Initial boiling point | ° C. | 200 |
| Final boiling point | ° C. | 620 |

TABLE III

Operating Conditions and product yields

| Sample description | | Expt-1 VR | Expt-2 VR: Biooil (95:5) | Expt-3 VR: Biooil (90:10) | Expt-4 VR: Biooil (87:13) |
|---|---|---|---|---|---|
| Water, % of total feed | | 1.2 | 0.8 | 1.1 | 1.3 |
| COT | ° C. | 495.0 | 495.0 | 495.0 | 495.0 |
| DCD pressure | kg/cm² | 1.05 | 1.05 | 1.05 | 1.05 |
| Product Yield Pattern (Basis: fresh feed) | | | | | |
| $H_2 + C_1 + C_2$ | wt % | 3.47 | 4.79 | 3.72 | 2.43 |
| LPG | wt % | 3.00 | 4.27 | 2.85 | 2.31 |
| $C_5$-150° C. | wt % | 6.09 | 7.52 | 4.35 | 4.61 |
| 150-350° C. | wt % | 27.21 | 28.95 | 36.59 | 28.73 |
| 350° C.$^+$ | wt % | 34.48 | 31.10 | 31.78 | 39.14 |
| Gas yield | wt % | 6.47 | 9.06 | 6.57 | 4.74 |
| Liquid Yield | wt % | 67.79 | 67.57 | 72.72 | 72.47 |
| Coke Yield | wt % | 25.74 | 23.37 | 20.71 | 22.79 |
| Δ Coke yield | wt % | | (−) 9.2 | (−) 19.5 | (−) 11.5 |

Thermo Gravimetric Analysis (TGA) of mixture of Vacuum Residue (VR) feed having different Conradson Carbon Residue (CCR) with bio-oil has been carried out and comparative results are given in the Tables IV to VI and FIGS. 5 to 7. From these data, it is observed that the effect of bio oil addition has negligible effect in the case of low CCR VR and there is no reduction in coke yield.

TABLE IV

TGA results of high CCR VR (CED-00407) with bio oil
Heating rate: 10 deg C./min upto 500 deg C., held for 6 hrs in inert environment

| Bio oil, wt % | Sample | No. | Conversion, wt % | Coke, wt % |
|---|---|---|---|---|
| 0 | Vacuum Resid (VR) | CED-00407 | 68.45 | 31.55 |
| 5 | VR + Bio oil (95% + 5%) | CE-19036 | 80.71 | 19.29 |
| 10 | VR + Bio oil (90% + 10%) | CE-19037 | 81.78 | 18.22 |
| 15 | VR + Bio oil (85% + 15%) | CE-19038 | 76.45 | 23.55 |

TABLE V

TGA results of low CCR VR (CED-3118) with bio oil
Heating rate: 10 deg C./min upto 500 deg C., held for 6 hrs in inert environment

| Bio oil, wt % | Sample | No. | Conversion, wt % | Coke, wt % |
|---|---|---|---|---|
| 0 | Vacuum Resid (VR) | CED-3118 | 93.34 | 6.66 |
| 5 | VR + Bio oil (95% + 5%) | CE-19492 | 93.03 | 6.97 |
| 10 | VR + Bio oil (90% + 10%) | CE-19493 | 93.2 | 6.8 |
| 15 | VR + Bio oil (85% + 15%) | CE-19494 | 93.59 | 6.41 |

TABLE VI

Properties of high CCR VR (CED-00407 and low CCR VR (CED-3118)

| Property | Unit | CED-00407 | CED-3118 |
|---|---|---|---|
| CCR | Wt % | 22.05 | 11/14.71 |
| Asphaltene | Wt % | 7.1 | 5.05 |
| Sulfur | Wt % | 5.18 | 0.73 |
| Na | ppm | 4 | 1 |
| Mg | ppm | 1 | 1 |
| Ni | ppm | 91 | 41 |
| V | ppm | 146 | 15 |
| Fe | ppm | 10 | 17 |
| Paraffins | Wt % | 43.5 | 38.8 |
| Aromatics | Wt % | 56.5 | 61.8 |

We claim:

1. A delayed coking process comprising a step of subjecting a mixed feed comprising residual heavy hydrocarbon feedstock and bio oil obtained from fast pyrolysis of ligno-cellulosic biomass of one or more of Jatropha, Cashew nut, Karanjia and Neem to the delayed coking process,
wherein the residual heavy hydrocarbon feedstock has Conradson carbon residue content of 22 to 27 wt % and the bio oil has Conradson carbon residue content of 7 to 10 wt %, wherein the mixed feed comprises 97 to 85 wt % of the residual heavy hydrocarbon feedstock and 3 to 15 wt % of the bio oil.

2. The process as claimed in claim 1, wherein the residual heavy hydrocarbon feedstock has boiling point in the range of 400° to 700° C.

3. The process as claimed in claim 1, wherein the bio oil has boiling point in the boiling range of about 200° to 620° C.

4. The process as claimed in claim 1, wherein the ligno-cellulosic biomass are selected from the group consisting of roots, stems, leaves and seeds or combination thereof.

5. The process as claimed in claim 1, wherein the mixed feed is obtained by:
(a) mixing residual heavy hydrocarbon feedstock and bio oil to obtain a mixture;
(b) feeding the mixture thus obtained in step (a) to a bottom of a fractionator along with a condensed recycle oil; and
(c) withdrawing the mixed feed from the bottom of the fractionator.

6. The process as claimed in claim 1, wherein the mixed feed is obtained by:
(a) feeding the residual heavy hydrocarbon feedstock to a bottom of a fractionator along with a condensed recycle oil;
(b) withdrawing a bottom fraction from the bottom of the fractionator; and
(c) mixing bio oil with the bottom fraction thus obtained in step (b) to obtain the mixed feed.

7. The process as claimed in claim 1, wherein the mixed feed is heated to a coking temperature prior to subjecting the same to delayed coking process.

8. The process as claimed in claim 7, wherein the coking temperature is in the range of 475° to 510° C.

9. The process as claimed in claim 1, wherein the delayed coking process comprises:
(a) feeding the mixed feed to a coker drum and providing residence time for allowing thermal cracking of the mixed feed under coking conditions;
(b) withdrawing vapours from the coker drum and adding a quench media to the vapours thus withdrawn to obtain effluent vapours;
(c) transporting the effluent vapours thus obtained to a fractionator for separation into various products according to desired boiling ranges.

10. The process as claimed in claim 9, wherein the residence time is in the range of 12 to 38 hours.

* * * * *